(12) United States Patent
Sirohi et al.

(10) Patent No.: US 8,931,732 B2
(45) Date of Patent: Jan. 13, 2015

(54) ELECTRIC POWERED ROTARY-WING AIRCRAFT

(75) Inventors: Jayant Sirohi, Milford, CT (US); Timothy Fred Lauder, Oxford, CT (US); Mark R. Alber, Milford, CT (US); Daniel Bazzani, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1917 days.

(21) Appl. No.: 12/018,217

(22) Filed: Jan. 23, 2008

(65) Prior Publication Data

US 2009/0140095 A1 Jun. 4, 2009

Related U.S. Application Data

(60) Provisional application No. 60/991,395, filed on Nov. 30, 2007.

(51) Int. Cl.
| | |
|---|---|
| *B64C 27/00* | (2006.01) |
| *B64D 27/24* | (2006.01) |
| *B64C 27/22* | (2006.01) |
| *B64C 27/68* | (2006.01) |
| *B64C 29/00* | (2006.01) |
| *B64C 39/02* | (2006.01) |

(52) U.S. Cl.
CPC .............. *B64D 27/24* (2013.01); *B64C 27/22* (2013.01); *B64C 27/68* (2013.01); *B64C 29/00* (2013.01); *B64C 39/024* (2013.01); *B64C 2201/024* (2013.01); *B64C 2201/042* (2013.01); *B64C 2201/108* (2013.01); *Y02T 50/44* (2013.01); *Y02T 50/64* (2013.01)
USPC ....................................... 244/17.21

(58) Field of Classification Search
USPC ........... 244/17.11, 17.13, 17.19, 17.25, 17.21
See application file for complete search history.

(56) References Cited

U.S. PATENT DOCUMENTS

| | | | | |
|---|---|---|---|---|
| 2,961,052 A | * | 11/1960 | Smith et al. ..................... | 416/26 |
| 3,857,194 A | * | 12/1974 | Guttman ......................... | 446/36 |
| 4,109,885 A | | 8/1978 | Pender | |
| 4,418,880 A | | 12/1983 | de Waal | |
| 4,601,444 A | | 7/1986 | Lindenbaum | |
| 4,695,012 A | | 9/1987 | Lindenbaum | |
| 4,786,014 A | | 11/1988 | Pesando et al. | |
| 5,054,713 A | | 10/1991 | Langley et al. | |
| 5,115,996 A | | 5/1992 | Moller | |
| 5,123,615 A | | 6/1992 | Wagner et al. | |
| 5,351,911 A | | 10/1994 | Neumayr | |
| 5,361,581 A | | 11/1994 | Clark | |
| RE35,172 E | | 3/1996 | Clark | |

(Continued)

OTHER PUBLICATIONS

Dave Jackson, ~ Other: Helicopter—Inside—Coaxial—Electric Motor Located between Rotors, ~ Internet; Initially displayed: Apr. 21, 2003 ~ Posed on PPRuNe: May 15, 2004 ~ Last Revised: Jul. 4, 2005, ~ Web page / 3 hardcopy pages, ~ Publisher; Uniserve communications Corporation, New Westminster, Canada. ~ http://www.unicopter.com/0812.html.

(Continued)

*Primary Examiner* — Timothy D. Collins
*Assistant Examiner* — Justin Benedik
(74) *Attorney, Agent, or Firm* — Carlson, Gaskey & Olds, P.C.

(57) ABSTRACT

A rotary-wing aircraft with an electric motor mounted along an axis of rotation to drive a rotor system about the axis of rotation.

15 Claims, 3 Drawing Sheets

(56) References Cited

U.S. PATENT DOCUMENTS

| | | | |
|---|---|---|---|
| 5,575,438 A | | 11/1996 | McGonigle et al. |
| 5,609,312 A | * | 3/1997 | Arlton et al. ............... 244/17.11 |
| 5,627,311 A | | 5/1997 | Nakaya et al. |
| 5,687,930 A | | 11/1997 | Wagner et al. |
| 5,756,891 A | | 5/1998 | Nakaya et al. |
| 5,866,813 A | | 2/1999 | Nakaya et al. |
| 5,879,131 A | * | 3/1999 | Arlton et al. ............... 416/223 R |
| 6,016,991 A | | 1/2000 | Lowe, Jr. |
| 6,179,247 B1 | | 1/2001 | Milde, Jr. |
| 6,270,036 B1 | | 8/2001 | Lowe, Jr. |
| 6,346,025 B1 | | 2/2002 | Tachau et al. |
| 6,382,556 B1 | * | 5/2002 | Pham ............................... 244/6 |
| 6,450,446 B1 | | 9/2002 | Holben |
| 6,502,787 B1 | | 1/2003 | Barrett |
| 6,550,715 B1 | | 4/2003 | Reynolds et al. |
| 6,622,472 B2 | | 9/2003 | Plumpe, Jr. |
| 6,655,631 B2 | | 12/2003 | Austen-Brown |
| 6,659,395 B2 | * | 12/2003 | Rehkemper et al. ....... 244/17.11 |
| 6,732,972 B2 | | 5/2004 | Malvestuto, Jr. |
| 6,808,140 B2 | | 10/2004 | Moller |
| 6,886,776 B2 | | 5/2005 | Wagner et al. |
| 6,908,286 B2 | * | 6/2005 | Leskow et al. ............. 416/170 R |
| 6,966,174 B2 | | 11/2005 | Paul |
| 6,974,105 B2 | | 12/2005 | Pham |
| 7,032,861 B2 | | 4/2006 | Sanders, Jr. et al. |
| 7,149,611 B2 | | 12/2006 | Beck et al. |
| 7,159,817 B2 | | 1/2007 | VanderMey et al. |
| 7,178,758 B2 | * | 2/2007 | Rehkemper ................ 244/17.11 |
| 7,201,346 B2 | | 4/2007 | Hansen |
| 7,249,732 B2 | | 7/2007 | Sanders, Jr. et al. |
| 2002/0005456 A1 | | 1/2002 | Toulmay |
| 2004/0200924 A1 | | 10/2004 | Clark, Jr. et al. |

OTHER PUBLICATIONS

Jayant Sirohi, ~ Design and Testing of a Rotary Wing MAV with an Active Structure for Stability and Control, ~ 61st American Helicopter Society's Annual Forum, ~ Date; Jun. 1-3, 2005, ~ 1 Web page / 11 hardcopy pages, ~ Publisher ~ http://www.vtol.org/pdf/61AircraftDesionll.pdf.

Dave Jackson, ~ Electrotor ~ Rotor, ~ Internet; Initially displayed: Aug. 6, 2006 ~ Last Revised: Sep. 28, 2006, ~ 1 Web page / 3 hardcopy pages, ~ Publisher Uniserve Communications Corporation, PO Box 187, 610 6th Street, New Westminster, BC, V3L 3C2, Canada. ~ http://www.unicopter.com/ElectrotorSloMo_Rotor.html.

Dave Jackson, ~ Aerodynamics ~ Two electrically driven rotor concepts for future rotorcraft, ~ Jun. 23, 2007, ~ 1 Web page, ~ Publisher ~ PPRuNe ~ Professional Pilots Rumor Network ~ Internet Brands Inc, El Segundo, USA ~ http://www.pprune.org/rotorheads/281332-aerodynamics-two-electrically-driven-rotor-concepts-future-rotorcraft.html.

Dave Jackson, [Intermesher], ~ Electrically driven rotor concept for future rotorcraft. ~ Jun. 24, 2007 ~ 1 Web page / 2 hardcopy pages, ~ Publisher; ~ Eng-Tips Forums—Tecumseh Group, Inc., Herndon, USA ~ http://www.eng-tips.com/viewthread.cfm?qid=190505&page=1.

Dave Jackson, ~ ElectrotorPlus ~ MGGA ~ Patent ~ Potential Patent Application ~ Placed on the Internet on Jul. 7, 2007 ~ 1 Web page / 12 hardcopy pages, ~ Publisher; Uniserve Communications Corporation, New Westminster, Canada, ~ http://www.unicopter.com/ElectrotorPlus_Patent_Application.doc, http://www.unicopter.com/PATENT_FIG_5.DXF.

Dave Jackson, ~ Design: Electrotor-Simplex—Rotor—Hub—Overview of Gimbaled w/ Torque Collective A ~ Internet; Initially displayed: Sep. 29, 2007 ~ Last Revised: Oct. 4, 2007, ~ 1 Web page / 3 hardcopy pages, ~ Publisher; Uniserve Communications Corporation, New Westminster, Canada, ~ http://www.unicopter.com/1566.html.

Dave Jackson, [Rotor Rooter], ~ Electrically driven rotor concept for future rotorcraft. ~ Oct. 22, 2007 ~ 1 Web page, ~ Publisher; Rotary Wing Forum, Spokane, USA. ~ http://www.rotaryforum.com/forum/showthread.php?p=197918&highlight=exceptionally#post197918.

Dave Jackson, ~ Design: Electrotor-Simplex—Control—Electrical—Layout ~ Internet; Initially displayed: Sep. 29, 2007 ~ Last Revised: Nov. 22, 2007 ~ Publisher; Uniserve Communications Corporation, New Westminster, Canada. ~ http://www.unicopter.com/1594.html.

Dave Jackson, ~ Design: Electrotor-Simplex—Control. ~ Internet; Last Revised: Nov. 28, 2007 ~ Publisher; Uniserve Communications Corporation, New Westminster, Canada. ~ http://www.unicopter.com/A143.html.

PCT International Search Report and Written Opinion mailed Aug. 14, 2009, PCT/US2008/076962.

* cited by examiner

ELECTRIC POWERED ROTARY-WING AIRCRAFT

The present application claims priority to U.S. Provisional Patent Application Ser. No. 60/991,395, filed Nov. 30, 2007.

BACKGROUND

The present invention relates to a rotary-wing aircraft with an electric propulsion system.

Conventional rotary-wing aircraft typically utilize a mechanical drive train to transmit power from one or more engines to drive main and tail rotor systems. The helicopter mechanical drive train may include a main rotor gearbox, an intermediate gearbox, a tail rotor gearbox and their interconnecting shafts. The main rotor gearbox converts the high speed input from each engine to a low speed output for the main rotor system. The main rotor gearbox may also provide power take-offs to drive an anti-torque system, a hydraulic system and other such systems. Elimination of the main gearbox and hydraulic systems may result in a significant reduction in aircraft weight and maintenance requirements.

SUMMARY

A rotary-wing aircraft according to an exemplary aspect of the present invention includes a rotor system rotatable about an axis of rotation and an electric motor mounted along said axis of rotation to drive said rotor system about said axis of rotation.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
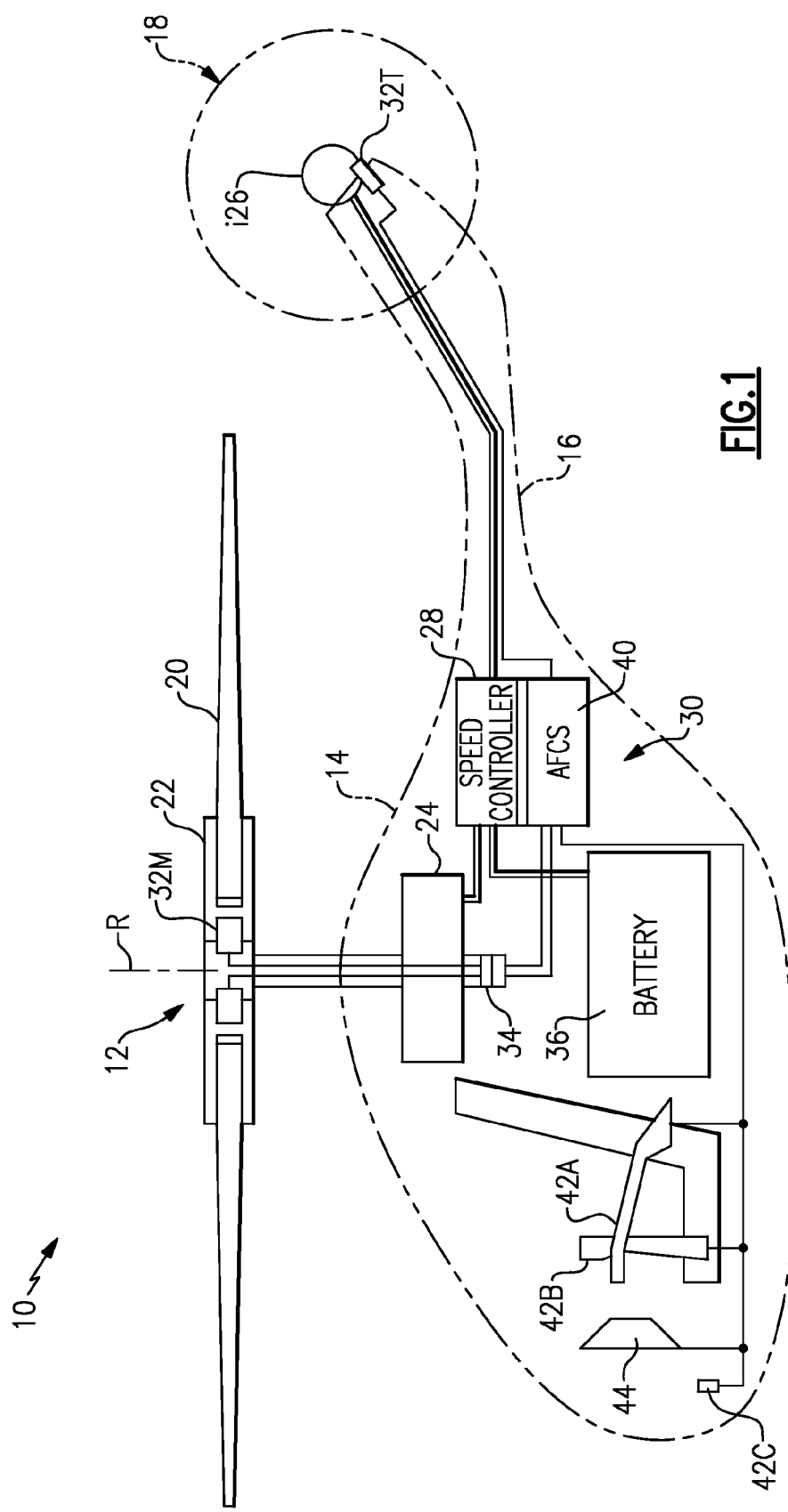
FIG. 1 is a general schematic view of one exemplary all-electric vertical takeoff and landing (VTOL) rotary-wing aircraft in one non-limiting embodiment of the present invention.

FIG. 1 schematically illustrates an exemplary all-electric vertical takeoff and landing (VTOL) rotary-wing aircraft 10. The aircraft 10 in the non-limiting embodiment of FIG. 1 includes a main rotor system 12 supported by an airframe 14 having an extending tail 16 which mounts an anti-torque system 18 such as a tail rotor system. The main rotor system 12 includes a multiple of rotor blades 20 mounted to a rotor hub 22. Although a particular helicopter configuration is schematically illustrated in the disclosed non-limiting embodiments, other configurations and/or machines, such as Unmanned Air Vehicles, high speed compound rotary wing aircraft with supplemental translational thrust systems, dual contra-rotating, coaxial rotor system aircraft, tilt-rotors and tilt-wing aircraft in either manned or unmanned configurations will also benefit herefrom.

The main rotor system 12 is driven about an axis of rotation R through an electric motor 24 such as a high torque, low speed electric motor. The electric motor 24 may directly drive the main rotor system 12 without a main rotor gearbox and may in one non-limiting embodiment be an overrunning electric motor which incorporates an overrunning clutch that disengages when the rotor system 12 rotates faster than the electric motor 24. A secondary electric motor 26 within the extending tail 16 direct drives the anti-torque system 18. The electric motors 24, 26 may be controlled by an electronic speed controller 28 over a wide range of speeds in response to a flight control system 30. A slip ring system 34 may be located prior to the motor 24. That is, the slip ring system 34 is located in communication with the rotor section of the motor 24.

An electromechanical servo system 32 may include a main rotor servo system 32M which pitches each rotor blade 20 and an anti torque servo system 32T which operates the anti torque system 18. The main rotor servo system 32M, in one non-limiting embodiment, is mounted directly within the rotor hub 22 to pitch each rotor blade 20 individually. The anti torque servo system 32T, in one non-limiting embodiment, is mounted within the extending tail 16. Power for the electric motors 24, 26 and electromechanical actuators are supplied by an on-board power source 36 such as a battery, hybrid source of electricity or such like. It should be understood that various power sources may be alternatively or additionally provided. The electromechanical servo system 32 is powered by the on-board power source 36 and controlled through the flight control system 30.

The flight control system 30 generally includes an automatic flight control system (AFCS) 40 in communicating with other avionics systems and components such as the electronic speed controller 28, a collective controller 42A, a cyclic controller 42B, a yaw controller 42C and a cockpit instrument display system 44. It should be understood that at least some of these subsystems need not be provided for an Unmanned Air Vehicle (UAV) embodiment.

Figure 2:
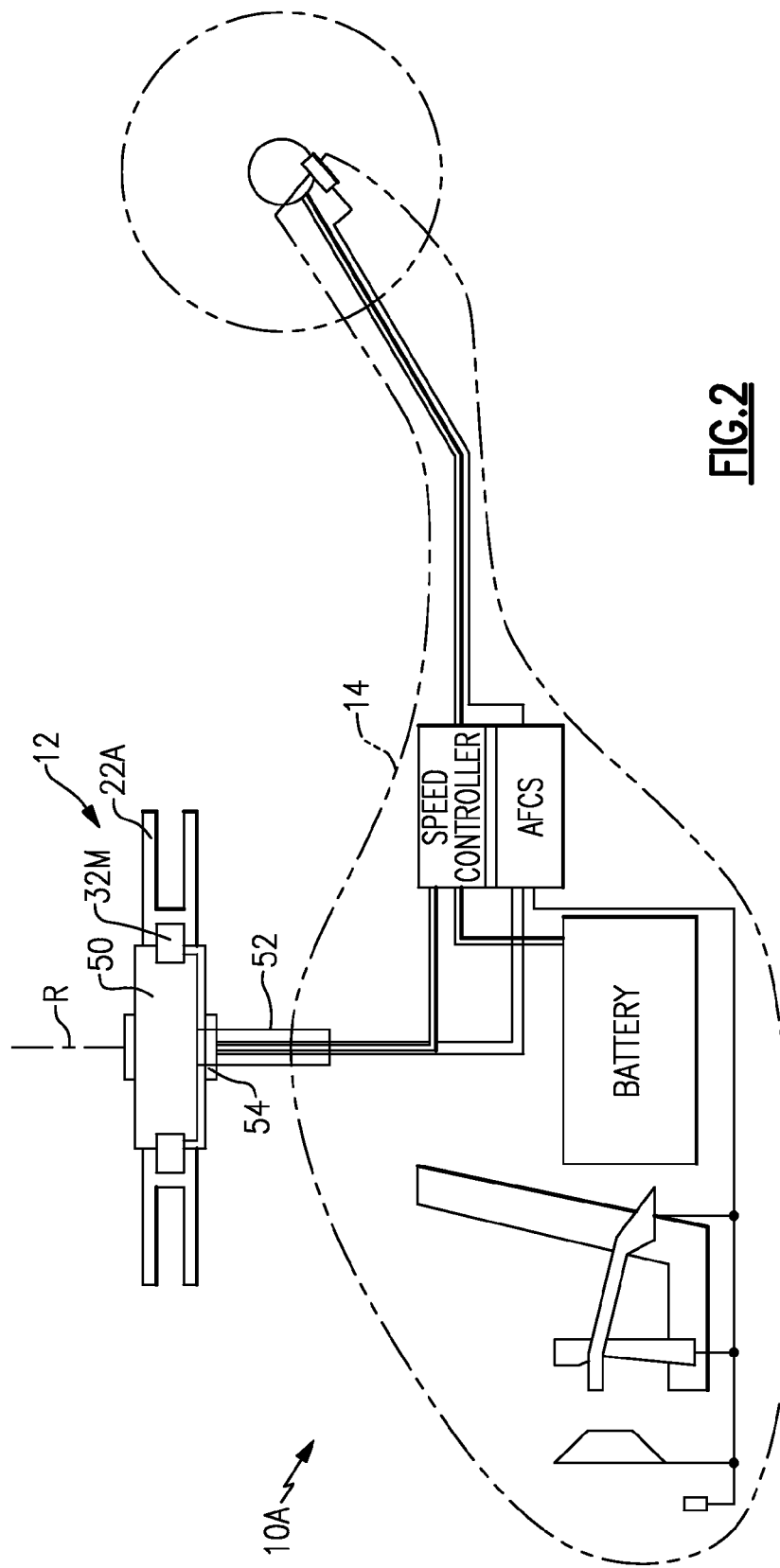
FIG. 2 is a general schematic view of another exemplary all-electric vertical takeoff and landing (VTOL) rotary-wing aircraft in one non-limiting embodiment of the present invention.

FIG. 2 schematically illustrates another exemplary all-electric vertical takeoff and landing (VTOL) rotary-wing aircraft 10A. In this non-limiting embodiment, a high torque, low speed electric motor 50 is integrated into the main rotor hub 22A of the main rotor system 12. The rotor hub 22A may include at least a portion of a rotor section of the electric motor 50 while a main rotor shaft 52 is non-rotating and fixed to the airframe 14. A slip ring system 54 may be located intermediate the motor 50 and the main rotor shaft 52. In this non-limiting embodiment, a main rotor gearbox is eliminated.

Figure 3:
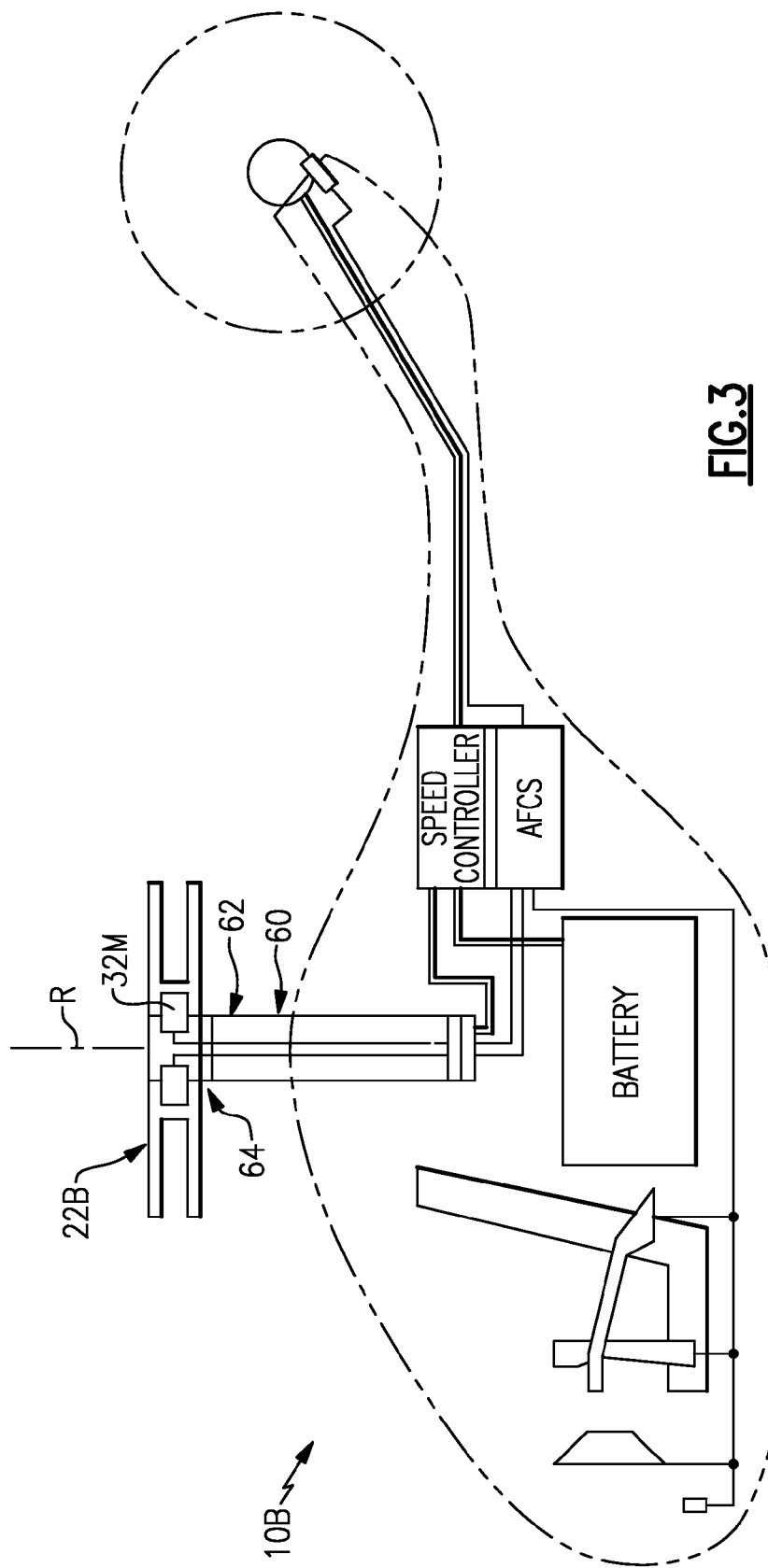
FIG. 3 is a general schematic view of another exemplary all-electric vertical takeoff and landing (VTOL) rotary-wing aircraft in one non-limiting embodiment of the present invention.

FIG. 3 schematically illustrates another exemplary all-electric vertical takeoff and landing (VTOL) rotary-wing aircraft 10B. In this non-limiting embodiment, a high torque, low speed electric motor 60 is integrated into a main rotor shaft 62. The main rotor shaft 62 may include at least a portion of a rotor section of the electric motor 60. A slip ring system 64 may be located adjacent the electric motor 60, e.g., in the main rotor hub 22B. In this non-limiting embodiment, a main rotor gearbox is eliminated.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary-wing aircraft comprising:
a rotor system rotatable about an axis of rotation; and
an electric motor mounted along said axis of rotation to drive said rotor system about said axis of rotation; and
a servo system mounted within said rotor system to pitch a rotor blade mounted to a rotor hub.

2. The aircraft as recited in claim 1, further comprising a controller within said rotary-wing aircraft to operate said servo system.

3. A rotary-wing aircraft comprising:
a rotor system rotatable about an axis of rotation; and
an electric motor mounted along said axis of rotation to drive said rotor system about said axis of rotation, said electric motor mounted at least partially within a rotor hub of said rotor system.

4. The aircraft as recited in claim 3, further comprising a rotationally fixed rotor shaft which mounts said rotor hub.

5. The aircraft as recited in claim 3, wherein said electric motor is an overrunning motor.

6. The aircraft as recited in claim 3, further comprising a servo system mounted within said rotor system to pitch a rotor blade mounted to a rotor hub.

7. The aircraft as recited in claim 6, further comprising a controller within said rotary-wing aircraft to operate said main rotor servo system.

8. The aircraft as recited in claim 3, wherein said electric motor is mounted completely within said rotor hub.

9. The aircraft as recited in claim 3, wherein said servo system is operable to pitch a rotor blade mounted to said rotor hub.

10. A rotary-wing aircraft comprising:
a rotor system rotatable about an axis of rotation; and
an electric motor mounted along said axis of rotation to drive said rotor system about said axis of rotation, said electric motor mounted at least partially within a rotor shaft of said rotor system.

11. The aircraft as recited in claim 10, wherein said electric motor is an overrunning motor.

12. The aircraft as recited in claim 10, further comprising a servo system mounted within said rotor system to pitch a rotor blade mounted to a rotor hub.

13. The aircraft as recited in claim 12, further comprising a controller within said rotary-wing aircraft to operate said servo system.

14. The aircraft as recited in claim 10, wherein said electric motor is mounted completely within said rotor shaft.

15. The aircraft as recited in claim 10, wherein said servo system is operable to pitch a rotor blade mounted to said rotor hub.

* * * * *